United States Patent
Dwyer et al.

(10) Patent No.: US 6,701,518 B1
(45) Date of Patent: Mar. 2, 2004

(54) SYSTEM AND METHOD FOR ENABLING EFFICIENT PROCESSING OF A PROGRAM THAT INCLUDES ASSERTION INSTRUCTIONS

(75) Inventors: Lawrence D. K. B. Dwyer, South San Francisco, CA (US); Carol L. Thompson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 498 days.

(21) Appl. No.: 09/631,552

(22) Filed: Aug. 3, 2000

(51) Int. Cl.[7] .................................................. G06F 9/44
(52) U.S. Cl. ..................................................... 717/126
(58) Field of Search ................................ 717/124–133, 717/137–147, 151–161

(56) References Cited

U.S. PATENT DOCUMENTS

| | | | |
|---|---|---|---|
| 5,450,586 A * | 9/1995 | Kuzara et al. | 717/124 |
| 5,450,588 A * | 9/1995 | Hoxey | 717/156 |
| 5,758,061 A * | 5/1998 | Plum | 714/35 |
| 5,784,553 A * | 7/1998 | Kolawa et al. | 714/38 |
| 6,253,317 B1 * | 6/2001 | Knapp et al. | 712/244 |
| 6,263,302 B1 * | 7/2001 | Hellestrand et al. | 703/17 |
| 6,463,582 B1 * | 10/2002 | Lethin et al. | 717/158 |
| 2003/0023834 A1 * | 1/2003 | Kalafatis et al. | 712/214 |

OTHER PUBLICATIONS

Yin, H and Bieman, J., "Improving software testability with assertion insertion", Oct. 1994, Proc. International Test Conference, pp. 831–839.*
Jonathan Cook, "Assertions in C++", Jun. 1994.*
David Weintraub, "Assertive Comments in APL Programming", May 1986, Proceedings of the international conference on APL, vol. 16 Issue 4.*
ISO/IEC 9899:1999(E) Programming Language C, Sec. 7.2–7.2.1.1, p. 169.

* cited by examiner

*Primary Examiner*—Kakali Chaki
*Assistant Examiner*—Tuan Vu

(57) ABSTRACT

The present invention relates to a system and method for reducing the adverse impact of assertion instructions to processor performance so that programmers will be encouraged to include assertion instructions in computer programs. The system of the present invention includes memory and a compiler. The memory stores a first program to be compiled by the compiler. The compiler, in compiling the first program, translates a first function of the first program into a second function of a second program. The first function has assertion instructions that are translated by the compiler into translated assertion instructions, which are included in the second function. In compiling the first program, the compiler enables selective execution, based on a run time input, of a portion of the translated assertion instructions included in the second function.

8 Claims, 6 Drawing Sheets

```
          ⋮                        ⎡—171
                                   ↙
    ⎧   LOAD  REGISTER10, AAAA
    |   LOAD  REGISTER11, AAAB
    |   ADD  REGISTER10, REGISTER11
    |   NO OP
    |   STORE  REGISTER11, BAAA
    |   NO OP
    |   NO OP
 67 ⎨   LOAD  REGISTER10, AAAC
    |   COMPARE  REGISTER10, REGISTER11
    |   BRANCH !=, AADA
    |   STORE REGISTER10, BAAB
    |   NO OP
    |   NO OP
    |   COMPARE REGISTER11, REGISTER12
    ⎩   BRANCH !=, AAFA
        END ⟵
              69
```

FIG. 5

(Prior Art)

```
         LOAD  REGISTER1, NULL
         LOAD  REGISTER2, FFFA
    ↗    COMPARE  REGISTER1, REGISTER2
  182    BRANCH !=, SKIP

LOAD  REGISTER3, NULL
         LOAD  REGISTER4, FFFB
    ↗    COMPARE  REGISTER3, REGISTER4
  184    BRANCH !=, SKIP

LOAD  REGISTER5, NULL
         LOAD  REGISTER6, FFFC
    ↗    COMPARE  REGISTER5, REGISTER6
  186    BRANCH !=, SKIP
```

FIG. 6

SYSTEM AND METHOD FOR ENABLING EFFICIENT PROCESSING OF A PROGRAM THAT INCLUDES ASSERTION INSTRUCTIONS

BACKGROUND OF THE INVENTION

1. Field of the Invention

The present invention generally relates to data processing techniques and, in particular, to a system and method for reducing the adverse impact of assertion instructions to processor performance so that programmers will be encouraged to include assertion instructions in computer programs.

2. Related Art

Computer programmers often insert assertions into computer code to help ensure that the computer code runs free of errors. An assertion is a Boolean statement used in a computer program to test a condition that, if the program is operating correctly, should always evaluate to a certain logic level (e.g., should always evaluate as true or should always evaluate as false). Therefore, if the tested condition evaluates to another logic level, then the assertion test fails, and it is known that an error in the execution of the program has occurred. When an assertion test fails, the program is typically terminated, and an appropriate error message is generated.

Although assertion testing helps to ensure correct operability of a running computer program, the inclusion of assertion instructions (i.e., instructions that perform assertion testing) in the computer program reduces performance. In particular, the execution of assertion instructions consumes processor time, yet the assertion instructions do not affect the functionality of a correctly operating computer program. In this regard, assertion testing affects the functionality of a program only when the assertion test fails, and the assertion test should never fail, if the program is operating properly.

As a result, many computer programmers insert assertion instructions into a computer program and utilize the assertion instructions only when testing or debugging the computer program. After the testing or debugging phase, the computer programmer will recompile the program into a version that does not include instructions for performing assertion testing. In this regard, most compilers provide an option for removing assertion instructions from the program being compiled. When the programmer selects to have the assertion instructions removed, the compiler ignores the assertion instructions in the source program. Therefore, the compiled version of the source program does not include instructions that have been translated from the assertion instructions included in the source program.

Consequently, when the compiled program executes, no assertion testing is performed, thereby maximizing the efficiency of a processor in executing the compiled program. However, even though the compiled program has already been tested and debugged at this point, it is possible for the program to include bugs that were not detected during the testing and debugging phases. These bugs may cause errors detectable by assertion instructions had the assertion instructions not been removed at compile time. Therefore, the optimized performance of running the program without assertion testing may allow the occurrence of an error that otherwise would have been detected by the assertion testing.

Thus, a heretofore unaddressed need exists in the industry for providing a system and method of reducing the adverse impact of assertion instructions to processor performance such that assertion instructions may be included in a program without significantly affecting the processor's performance in executing the program.

SUMMARY OF THE INVENTION

The present invention overcomes the inadequacies and deficiencies of the prior art as discussed hereinbefore. Generally, the present invention relates to a system and method for reducing the adverse impact of assertion instructions to processor performance so that programmers will be encouraged to include assertion instructions in computer programs.

In architecture, the system of the present invention includes memory and a compiler. The memory stores a first program to be compiled by the compiler. The compiler, in compiling the first program, translates a first function of the first program into a second function of a second program. The first function has assertion instructions that are translated by the compiler into translated assertion instructions, which are included in the second function. In compiling the first program, the compiler enables selective execution, based on a run time input, of a portion of the translated assertion instructions that are included in the second function.

The present invention can also be viewed as providing a method for enabling selective assertion testing of computer programs based on run time inputs. The method can be broadly conceptualized by the following steps: translating a first function of a first computer program into a second function of a second computer program, the first function having assertion instructions, the second function having translated assertion instructions translated from the assertion instructions of the first function; detecting stall locations within the second function of said second computer program; inserting one of the translated assertion instructions into one of the stall locations in response to a detection of the one stall location in the detecting step; inserting a block of the translated assertion instructions into the second function; and enabling selective execution of the block of translated assertion instructions based on a run time input.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 5 is a diagram of exemplary code that may be produced by the compiler depicted in FIG. 1 in producing the function depicted by FIG. 2.

FIG. 6 is a diagram of exemplary code that may be produced by the compiler depicted in FIG. 3 in translating assertion instructions of a program being compiled.

DETAILED DESCRIPTION OF THE PREFERRED EMBODIMENT

Generally described, the present invention relates to a system and method for reducing the adverse impact of assertion instructions to processor performance so that programmers will be encouraged to include assertion instructions in a computer program subsequent to the testing and debug phases. Before describing the features of the present invention, a conventional computer system 20, with reference to FIG. 1, will be described.

Figure 1:
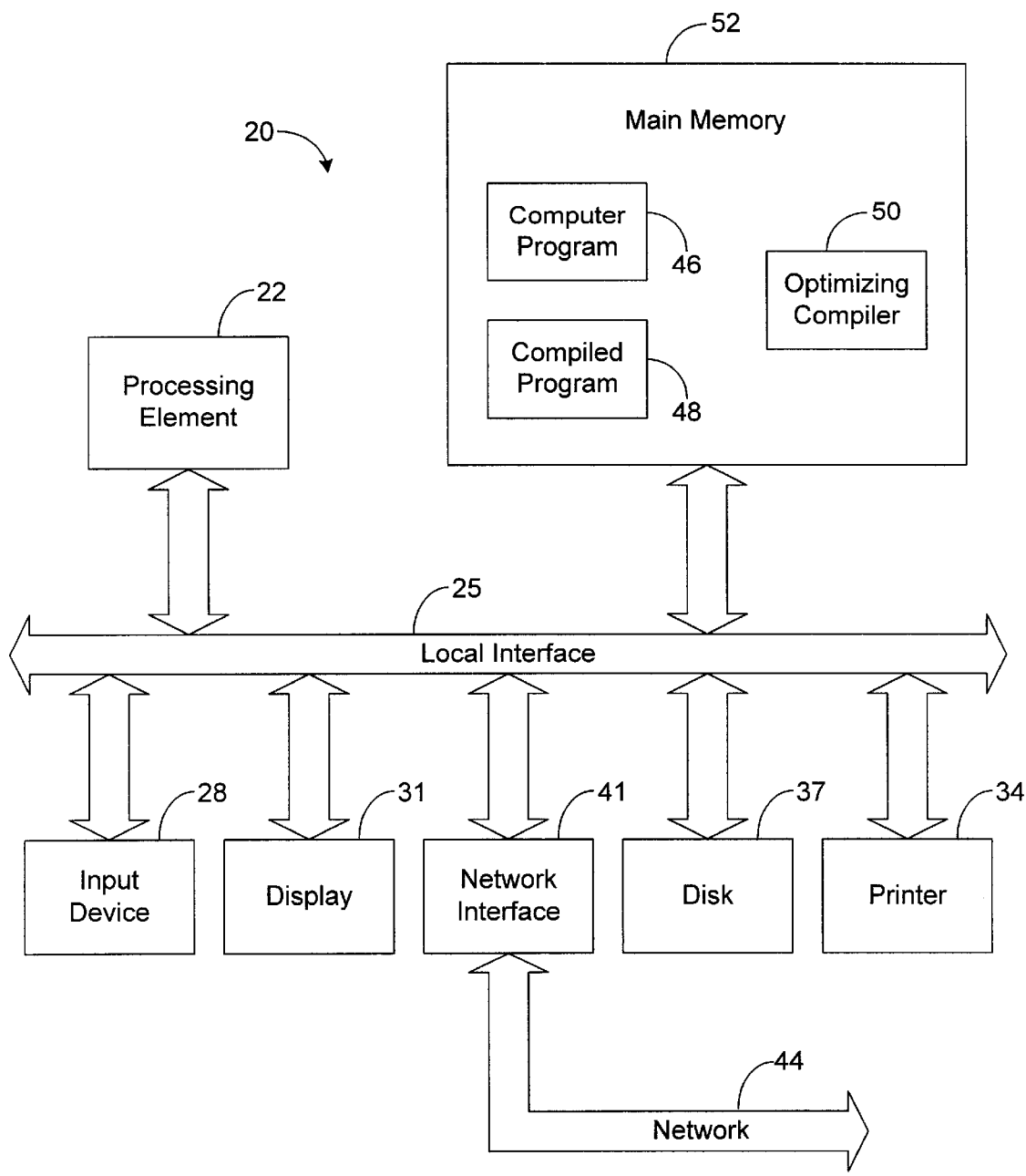
FIG. 1 is a block diagram illustrating a conventional computer system for compiling and executing computer programs.

The conventional computer system 20 of FIG. 1 comprises one or more conventional processing elements 22, such as a digital signal processor (DSP), that communicate to and drive the other elements within the system 20 via a local interface 25, which can include one or more buses. Furthermore, an input device 28, for example, a keyboard or a mouse, can be used to input data from a user of the system 20, and screen display 31 or a printer 34 can be used to output data to the user. A disk storage mechanism 37 can be connected to the local interface 25 to transfer data to and from a nonvolatile disk (e.g., magnetic, optical, etc.). The system 20 can be connected to a network interface 41 that allows the system 20 to exchange data with a network 44.

As shown by FIG. 1, the computer system 20 may include a computer program 46, a compiled program 48, and a compiler 50 stored in memory 52. The compiler 50 is configured to translate the computer program 46 into compiled program 48, which is in a form that may be interfaced directly with and executed by processing element 22. As an example, the computer program 46 may be written in a high level language (e.g., C or Fortran), and the compiled program 48 may be a compiled version of the computer program 46 in a lower level language (e.g., machine code).

Figure 2:
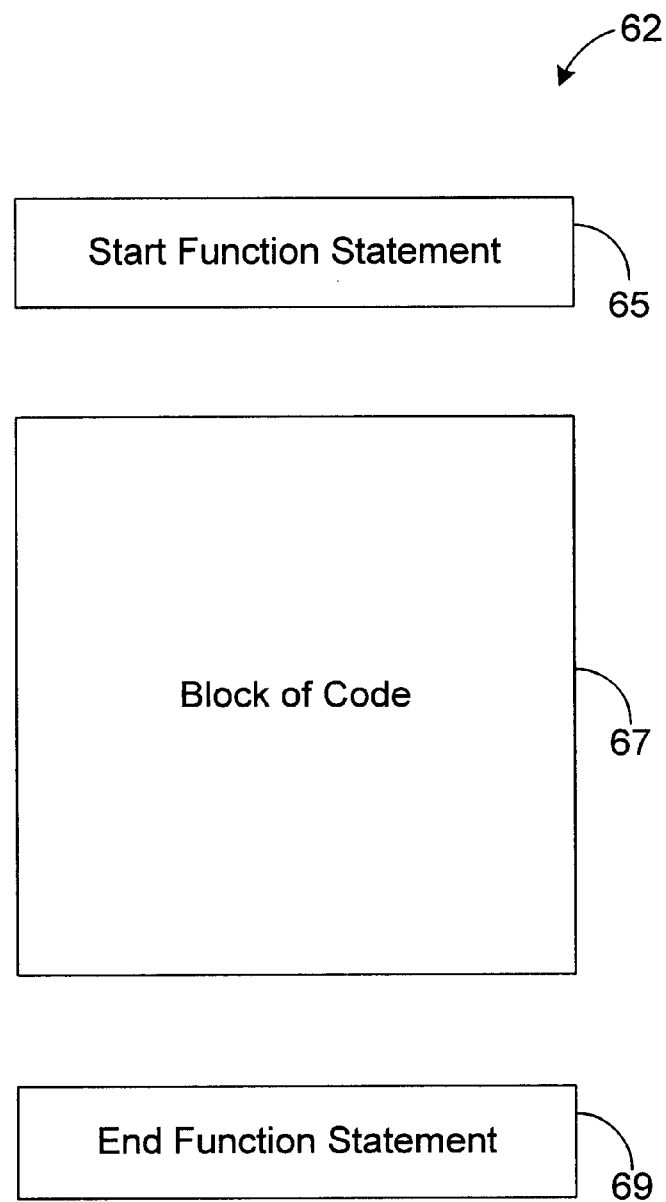
FIG. 2 is a block diagram illustrating a function compiled by a conventional compiler depicted in FIG. 1.

The computer program 46 may include a plurality of functions (e.g., subroutines) and may include assertion instructions within one or more of the functions. A function is a block of code that includes a start statement (e.g., a function name unique to the function) that marks the beginning of the function and that is followed by an end statement (e.g., a return instruction) that marks the end of the function. FIG. 2 show a block diagram of an exemplary function 62 that may be generated by compiler 50 in compiling program 46. As shown by FIG. 2, the function 62 includes a start function statement 65 marking the beginning of the function 62 and an end function statement 69 marking the end of the function 62. The function 62 also includes a block of code 67, which is a sequence of instructions that may be executed to perform any desired functionality.

The compiler 50 shown by FIG. 1 is an optimizing compiler, which employs various techniques to increase the execution performance of the compiled program 48. As an example, the optimizing compiler 50 analyzes the instructions of the program 46 and/or 48 to determine which instructions of the compiled version (i.e., program 48) are to be stalled during execution. In this regard, an instruction is stalled when execution of the instruction is temporarily halted until a particular condition occurs. For example, a first instruction, when executed, may retrieve data that is utilized in the execution of a second instruction. If execution of the second instruction is commenced before the foregoing data is retrieved and available for use in executing the second instruction, then an error may occur. The execution of the second instruction should be temporarily halted or, in other words, the second instruction should be stalled until the foregoing data is available. If the second instruction is not stalled until the foregoing data is available, then a data error may occur as the second instruction will likely utilize incorrect data during execution.

If the optimizing compiler 50 determines that the second instruction is to be stalled at run time, the optimizing compiler 50 may rearrange the order of the instructions to reduce the execution time of the compiled program 48. For example, the optimizing compiler 50 may move a third instruction to a stall location associated with the expected stalling of the second instruction. As used herein a "stall location" is a location in a computer program, in which any instruction located at the stall location will execute during a stall of another instruction. Therefore, the third instruction should execute during the stall of the second instruction. Thus, processing time is not wasted waiting on the stall of the second instruction to expire. U.S. Pat. No. 5,450,588, entitled "Reducing Pipeline Delays in Compilers by Code Hoisting," which is incorporated herein by reference, describes an optimizing compiler that inserts instructions in front of instructions that are likely to be stalled, as described hereinabove.

It should be noted, however, that the rearranging of the instructions in a computer program is limited by certain constraints. For example, an instruction should be moved to a stall location only if it can be assured that the move will cause no data errors or create no additional data hazards. Thus, it is not always possible to move an instruction into each stall location of a program. If none of the instructions translated from program 46 by compiler 50 can be inserted into a particular stall location of compiled program 48, the compiler 50 usually inserts a "NO OP" (no operation) instruction into the stall location.

As noted in the Background of the Invention section, the compiler 50 can be configured to translate assertion instructions of the program 46 into translated assertion instructions and to include the translated assertion instructions in the compiled program 48. Alternatively, the compiler 50 can be configured to ignore the assertion instructions in the program 46, such that the compiled program 48 contains no translated assertion instructions. As used herein, the term "translated assertion instructions" shall refer to a set of instructions translated by a compiler from one or more assertion instructions in a program that is being compiled by the compiler.

By including translated assertion instructions in the compiled program 48, it is possible to detect certain types of data errors. However, the execution time required to execute the program 48 is typically increased when translated assertion instructions are included in the program 48. By ignoring any assertion instructions in the program 46, the execution time required to execute the compiled program 48 can be minimized since the compiled program 48 includes no translated assertion instructions, but it is not possible to detect the data errors detectable by the ignored assertion instructions. Therefore, a trade-off exists between configuring the compiler 50 to include translated assertion instructions in the program 48 and in configuring the compiler 50 to refrain from including translated assertion instructions in the program 48.

Figure 3:
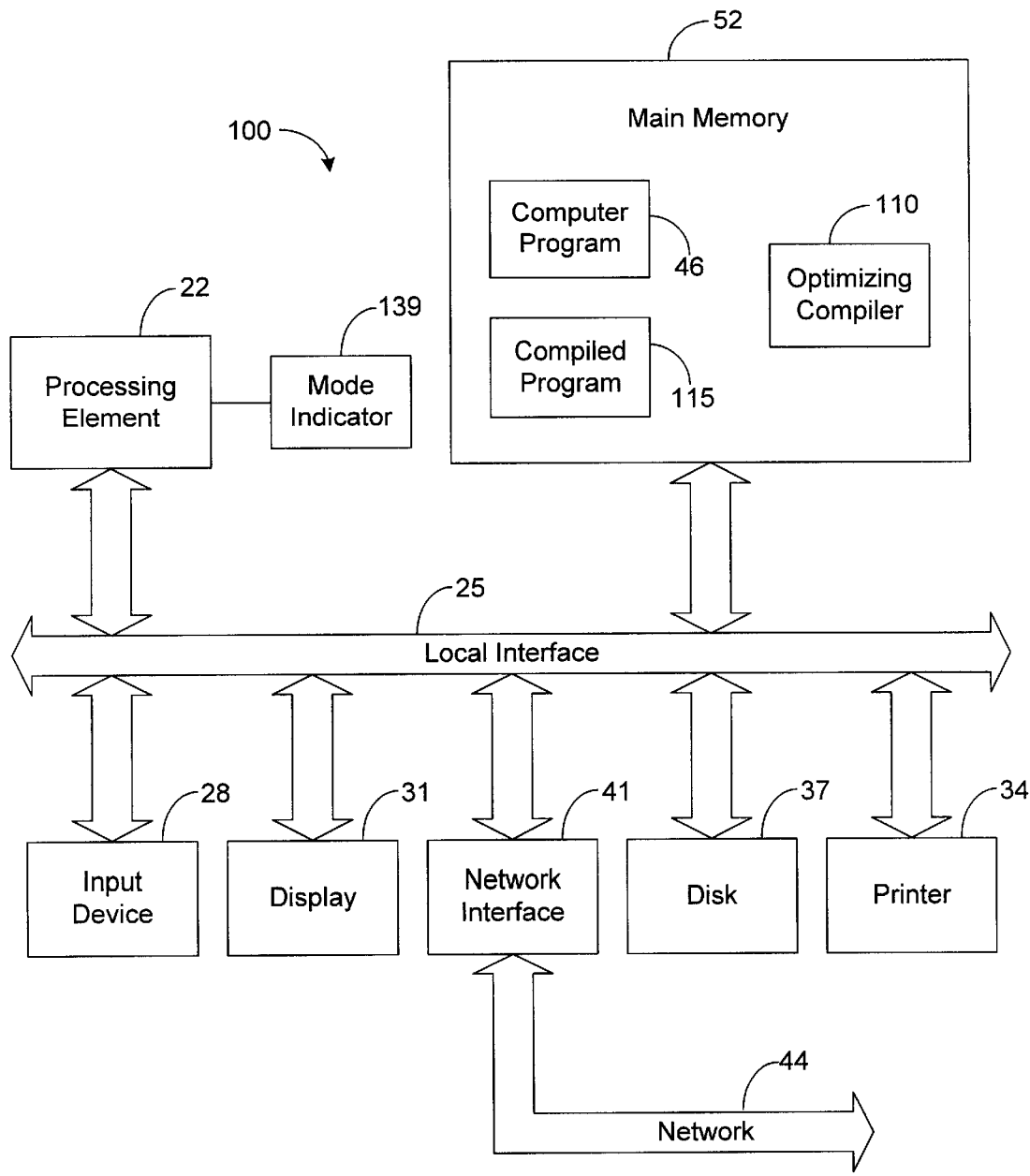
FIG. 3 is a block diagram illustrating a computer system in accordance with the present invention for compiling and executing computer programs.

FIG. 3 depicts a computer system 100 in accordance with the principles of the present invention. Similar to conventional system 20, the computer system 100 of the present invention preferably includes a processing element 22, local interface 25, an input device 28, a display screen 31, a printer 34, a disk storage mechanism 37, memory 52, and a network interface 41 that may interface the system 100 with a network 44. The system 100 also includes a computer program 46 that is translated or compiled by a compiler 110 into a compiled program 115. Except as otherwise described herein, the compiler 110 of the present invention preferably utilizes techniques similar to conventional optimizing compiler 50 to translate or compile the program 46. Therefore, in the preferred embodiment, the compiled program 115 corresponds to a version of the program 46 written in a lower level language. For example, the program 46 may be written in C or Fortran, and the compiled program 115 may be a version of the program 46 written in machine code, which can be directly interfaced with and executed by processing element 22.

Although the compiler 110 is shown in FIG. 1 as being implemented in software, the compiler 110 can be implemented in software, hardware, or a combination thereof. Note that the compiler 110, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the compiler 110 may be magnetically stored and transported on a conventional portable computer diskette.

The compiler 110 is preferably configured to compile the program 46 into compiled program 115 such that whether or not assertion testing is performed in a run of the program 115 can be controlled at run time. Therefore, the compiler 110 is designed to translate the assertion instructions of program 46 into translated assertion instructions and to include translated assertion instructions in the compiled program 115. Furthermore, the compiler 110 is configured to insert into the compiled program 115 mode selection instructions that enable the extent of assertion testing to be controlled at run time.

In the preferred embodiment, the mode selection instructions inserted into the program 115 by the compiler 110 allow the user to select one of three modes of operation. In a first mode of operation, assertion testing is turned on such that assertion testing is performed despite the adverse effect on performance caused by the assertion testing. In the first mode of operation (hereinafter referred to as "mode 1"), any error detectable by the translated assertion instructions in compiled program 115 should be detected, and termination of the program 115 should occur in response to a detection of such an error. In a second mode of operation (hereinafter referred to as "mode 2"), assertion testing is turned off such that the program 115 is not terminated even if the program 115 includes an error detectable by the translated assertion instructions. In a third mode of operation (hereinafter referred to as "mode 3"), assertion testing is performed to the extent that performance of the program 115 is not significantly affected. In this regard, assertion testing is performed for a function until the function is otherwise ready to complete. In particular, once all of the non-assertion instructions in a function have been executed (other than an end function statement marking the end of the function), assertion testing is halted for the function, and execution of the function ends via execution of the end function statement.

Figure 4:
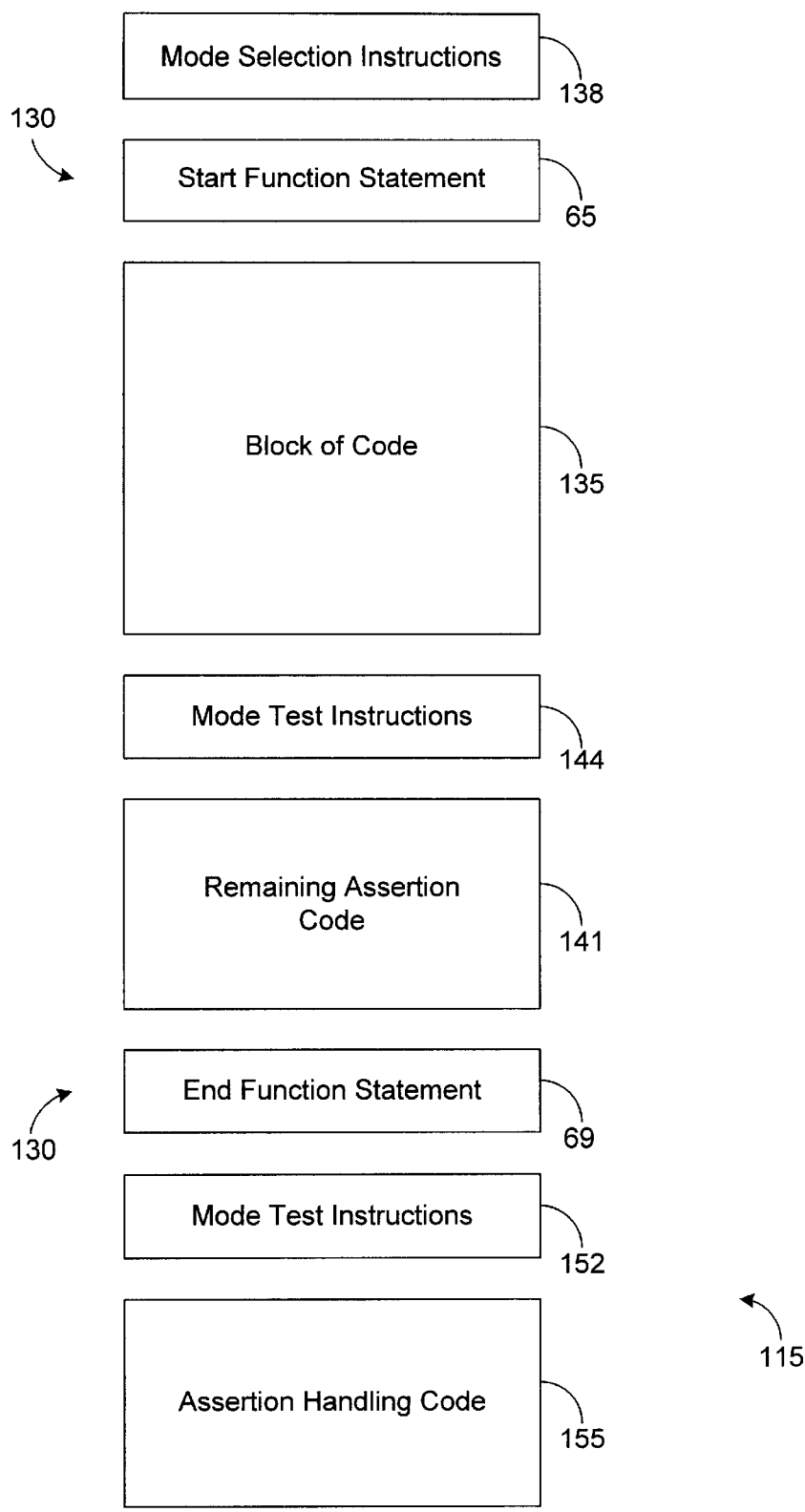
FIG. 4 is a block diagram illustrating a function compiled by a compiler depicted in FIG. 3.

To illustrate the principles of the present invention, refer to FIG. 4, which depicts a block diagram of an exemplary function 130 that has been translated by compiler 110. In this regard, function 130 represents a translated version of a function included in the program 46. Assume that the functions 62 and 130 depicted by FIGS. 2 and 4, respectively, have been translated from the same function in program 46. Therefore, FIG. 2 depicts a translated version of a function in program 46 as translated by compiler 50, and FIG. 4 depicts a translated version of the same function in program 46 as translated by compiler 110.

As shown by FIG. 4, the function 130 produced by compiler 110 includes a start function statement 65 that marks the beginning of function 130 and an end function statement 69 that marks the end of function 130. The function 130 also includes a block of code 135 that, when executed by processing element 22, should cause the processing element 22 to perform the functionality defined by the block of code 67 in the function 62 of FIG. 2. However, in the preferred embodiment, the block of code 135 also includes translated assertion instructions.

In this regard, the compiler 110 is preferably configured to compile the program 46 into program 115 according to conventional techniques, which are preferably optimizing techniques so that performance of program 115 is increased. In compiling the program 46, the compiler 110 is configured to analyze the program 46 and/or program 115 to determine where stalls are likely to occur in the compiled program 115. In other words, the compiler 110 identifies stall locations in the program 115. When possible, the compiler 110 is then configured to insert translated assertion instructions into the identified stall locations of program 115 (ie., the points in the block of code 135 where stalls will occur at run time). Therefore, translated assertion instructions placed into the code 135 by the compiler 110 should be executed by the processing element 22 at run time in unused cycles caused by stalls, and the processing time of executing the code 135 should not be affected by including the translated assertion instructions in the code 135.

The amount of stall locations in the block of code 135 may be limited, and it may not be possible to insert each translated assertion instruction into a stall location of code 135. Each translated assertion instruction associated with function 130 that is not placed in the block of code 135 is preferably inserted into the function 130 by the compiler 110 after the block of code 135 but before the end function statement 69. These translated assertion instructions are represented as the remaining assertion code 141 in FIG. 4.

The compiler 110 also inserts into the program 115 a set of instructions, referred to herein as mode selection instructions 138. When executed by processing element 22, the mode selection instructions 138 cause the processing element 22 to set a mode indicator 139 (FIG. 3), such as one or more flags in a control register or some other data location, for example, that indicates which of the three aforementioned modes of operation is selected at run time. For example, in response to the mode selection instructions 138, the processing element 22 may prompt the user via a display device 31, for an input for selecting the mode of operation. In response, the user may enter an input via input device 28, and the mode indicator 139 may be set in response to execution of the mode select instructions 138 and based on the input provided by the user. Alternatively, the input used to set the mode select indicator may be passed to the function 130 from another function in program 115 or in another program (not shown) that calls the function 130. It should be apparent to one skilled in the art that there are various techniques that may be employed to set the mode indicator 139 for controlling the mode of operation, and any of these techniques may be employed in implementing the present invention.

The compiler 110 also inserts a set of instructions, referred to herein as mode test instructions 144, into the function 130 preferably before the remaining assertion code 141 and after the block of code 135. In response to the mode test instructions 144, the processing element 22 analyzes the mode indicator 139. If the mode indicator 139 indicates the selection of mode 1, then assertion testing is turned on. Therefore, after executing the mode test instructions 144, the processing element 22 proceeds to execute the remaining assertion code 141. However, if the mode indicator 139 indicates the selection of another mode (i.e., mode 2 or 3), then the remaining assertion code 141 should not be executed, and the function 130 is immediately terminated by executing the end function statement 69 after the mode test instructions 144.

The foregoing functionality may be accomplished by including in the mode test instructions 144 a conditional branch that causes the processing element 22 to branch to the end function statement 69 only when the mode indicator 139 indicates that mode 2 or 3 is selected. However, there are other techniques well known in the art that may be employed to achieve the foregoing functionality.

Outside of function 130, the compiler 110 preferably inserts mode test instructions 152 and assertion handling code 155. Each time an assertion test defined by the translated assertion instructions in function 130 fails, an error has occurred, and the translated assertion instructions in the function 130 cause the processing element 22 to branch to mode test instructions 152.

The mode test instructions 152, when executed by the processing element 22, cause the processing element 22 to analyze the mode indicator 139 to determine whether mode 3 has been selected. If mode 3 has been selected, then assertion testing has been turned off. Therefore, when the mode indicator 139 indicates that mode 3 has been selected, the mode test instructions 152, when executed by processing element 22, cause the processing element 22 to return to the function 130. Preferably, the processing element 22 returns to the instruction following the instruction that previously caused the processing element 22 to branch to the mode test instructions 152. This may be accomplished in a variety of ways. For example, upon branching to the mode test instructions 152, the address of the instruction causing the branch could be saved in a control register (not shown) or some other data location. To branch back to the function 130, this address could be retrieved and used to locate the instruction following the foregoing branch instruction that previously caused the branch to the mode test instructions 152.

If the mode indicator 139 indicates that mode 3 has not been selected (ie., another mode has been selected), then the mode test instructions 152, when executed by processing element 22, cause the processing element 22 to proceed to the assertion handling code 155 for execution. Therefore, the assertion handling code 155 is only executed when an error detectable by the translated assertion instructions in the function 130 has occurred and when the assertion testing is turned on via selection of either mode 1 or mode 2. In response to the assertion handling code 155, the processing element 22 appropriately handles the detected error. In the preferred embodiment, the assertion handling code 155, when executed by processing element 22, causes the processing element 22 to output an appropriate error message via display device 31 and/or printer 34 and to terminate the run of the program 115.

Although it is possible to place mode test instructions 152 and assertion handling code 155 within the function 130, it is preferable to place the instructions 152 and the code 155 outside of the function 130, as shown by FIG. 4. By placing the mode test instructions 152 outside of function 130, the performance effect to the function 130 can be minimized, and all functions in the program 115 can have direct access to the assertion handling code 155.

Note that the mode selection instructions 138, the mode test instructions 144, and/or the mode test instructions 152 are preferably generated automatically by the compiler 110 in the preferred embodiment. However, it is possible for a programmer of program 46 to include the functionality of these instructions in the program 46 so that the compiler 46 generates instructions 138, 144, and/or 152 by translating code from program 46.

Figure 7:
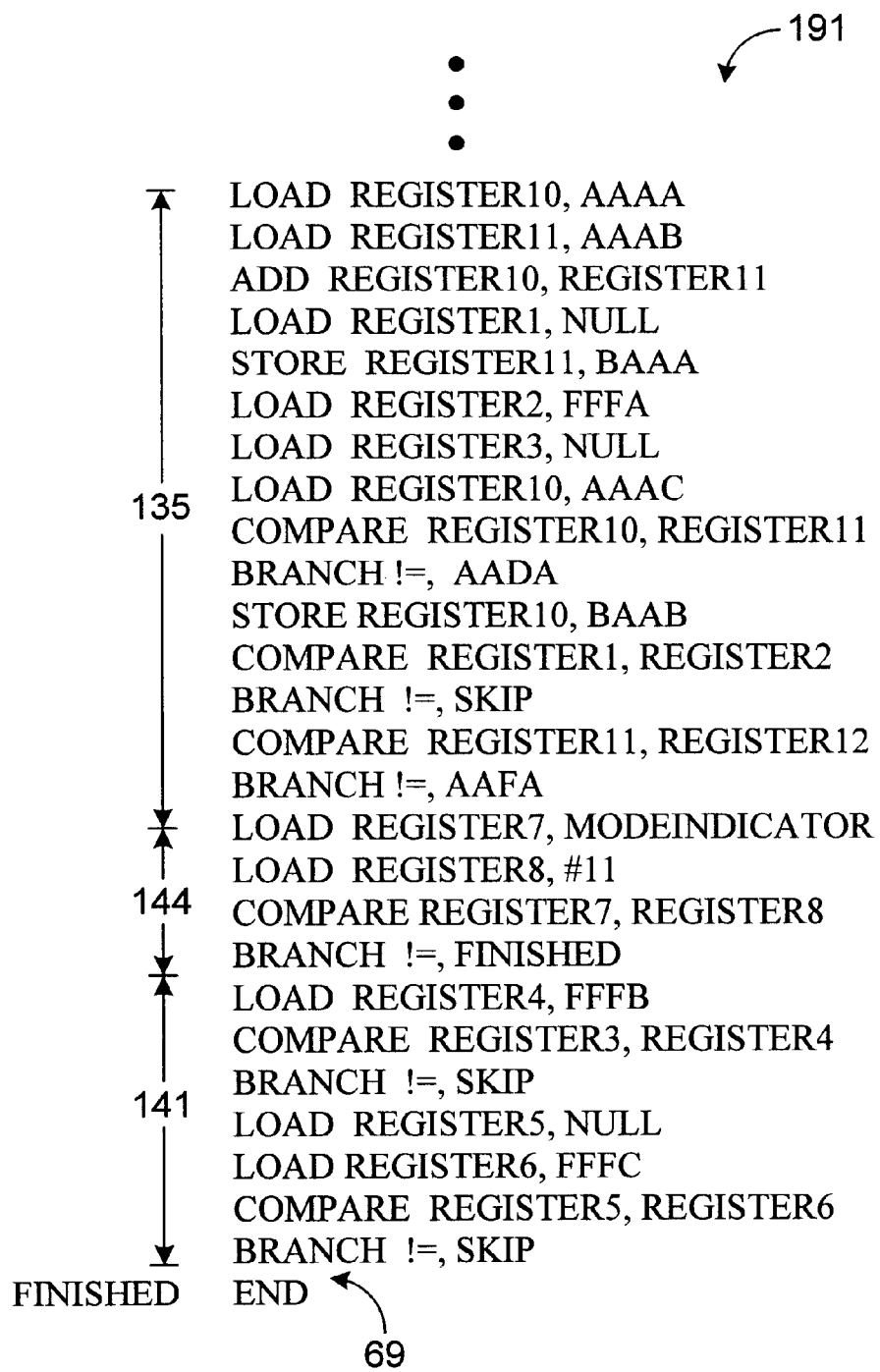
FIG. 7 is a diagram of exemplary code that may be produced by the compiler depicted in FIG. 3 in producing the function depicted by FIG. 4.

To better illustrate techniques that may be employed by compiler 110 to implement the present invention, refer to FIGS. 5–7. FIG. 5 depicts an exemplary block of code 171 defining a portion of a function in the program 48 (FIG. 1) written in machine code or, in other words, written in a form compatible with processing element 22. In this regard, the compiler 50 translates a portion of a function in the program 46 into the code 171 depicted in FIG. 5. These instructions may be used to form a portion of compiled program 48. In particular, the foregoing instructions may define the block of code 67 and the end function statement 69 of FIG. 2, in which "END" is the end function statement 69 and the other instructions of FIG. 5 are the block of code 67. It assumed that the compiler 50, in generating code 171, is designed to ignore assertion instructions in the program 46. In other words, assertion testing is turned off during compiling such that code 171 includes no instructions translated from assertion instructions in program 46.

Through techniques known in the art, compiler 50 detects which translated instructions (i.e., instructions translated from the instructions of program 46) in compiled program 48 will be stalled. The compiler 50 may then rearrange the order of translated instructions in code 171, at compile time, such that a translated instruction executes while another of the translated instructions is being stalled. In other words, the compiler 50 detects stall locations in code 171 and, where possible, moves translated instructions into the stall locations. However, compiler 50 is not always able to rearrange the order of translated instructions such that a translated instruction executes in each cycle in which an instruction is stalled. In other words, the compiler 50 is not always able to move a translated instruction to each stall location. As a result, for some cycles, there are no translated instructions that are to be executed. The compiler 50 usually inserts a "NO OP" (no operation) instruction into each stall location that does not have a translated instruction inserted therein. As shown by FIG. 5, a number of "NO OP" instructions exist in the compiled set of instructions 171.

Assume now that the same portion of the same function in program 46 is compiled by the compiler 110 of the present invention in translating program 46 into compiled program 115. Further assume that the foregoing portion of the function in program 46 includes three assertion instructions (in which each assertion instruction in program 46 defines an assertion test) and that the translated version of each of these assertion instructions is shown by FIG. 6 as blocks of code 182, 184, and 186, respectively. In other words, in compiling the three assertion instructions of program 46, the compiler generates code blocks 182, 184, and 186, respectively.

FIG. 7 depicts code 191 that may be generated by compiler 110 in compiling the aforementioned portion of the aforementioned function in program 46. Note that the code 191 is the same as the code 171 except that instructions from blocks of code 182 and 184 have been inserted into the code 191 in lieu of the "NO OP" instructions of code 171 and except that instructions have been inserted before the end function statement 69. In particular, instructions defining the mode test instructions 144 and the remaining assertion code 141 of FIG. 4 have been inserted before the end function statement 69 by the compiler 110. Note that the instructions of the remaining assertion code 141 are the instructions of code blocks 182, 184, and 186 that were not inserted into the block of code 135 in lieu of "NO OP" instructions.

It is assumed that the address identified by the word "SKIP" in the code 191 is the start of the mode test instructions 152 of FIG. 4. Therefore, if any of the assertion tests defined by assertion blocks 182, 184, or 186 fails at run time, at least one of the "BRANCH!=, SKIP" instructions should cause the processing element 22 to branch to mode test instructions 152. However, if each of the assertion tests defined by assertion blocks 182, 184, or 186 passes at run time, then each "BRANCH!=, SKIP" instruction does not induce a branch, and the processing element 22 proceeds to the next instruction after the "BRANCH!=, SKIP" instruction for execution.

Note that the test mode instructions 144, when executed by processing element 22, cause the processing element 22 to compare the mode indicator 139 to a predefined value. This predefined value should be set such that the "BRANCH!=, FINISHED" instruction, when executed by processing element 22, causes the processing element 22 to branch to the end function statement 69 only when the mode indicator 139 indicates that mode 2 has been selected. Otherwise, the processing element 22 proceeds to the next instruction (i.e., the "LOAD REGISTER4, FFFB" instruction) for execution.

OPERATION

The preferred use and operation of the system 100 and associated methodology are described hereafter with reference to FIG. 4.

Initially, compiler 110 compiles computer program 46 into compiled program 115. Some time thereafter, compiled program 115 is invoked and begins to run. The mode selection instructions 138 are executed, and the mode indicator 139 is set in response to execution of the mode selection instructions 138. For example, the processing element 22 (FIG. 3), in response to execution of the mode selection instructions 138, may transmit data defining a prompt message to the display device 31. In response to the foregoing data, the display device 31 may prompt the user (i.e., display a prompt message) to select the mode of operation. The user may then enter an input indicating which mode of operation is selected by the user. Based on this input and in response to the mode selection instructions 138, the processing element 22 sets the mode indicator 139 to indicate the selected mode of operation.

Assume in a first example that the mode indicator 139 indicates selection of mode 1 as the mode of operation. In other words, the mode indicator 139 indicates that assertion testing is turned on and that the translated assertion instructions in program 115 within the program flow of the present run are to be executed even though execution of these instructions may significantly impact processor performance. Assume that at some point after the selection of the mode of operation, the processing element 22 executes the block of code 135. As previously set forth hereinabove, translated assertion instructions are preferably included at stall locations in the block of code 135 and are, therefore, executed while other instructions in the block of code 135 are being stalled.

Once the block of code 135 is executed, the processing element 22 executes mode test instructions 144. In response to the mode test instructions 144, the processing element 22 tests the mode indicator 139 to determine whether the remaining assertion code 141 should be executed or whether the remaining assertion code 141 should be bypassed. Since the mode indicator 139 indicates that mode 1 has been selected and, therefore, that assertion testing is turned on, processing element 22 proceeds to execute the remaining assertion code 141. After executing the remaining assertion code 141, processing element 22 proceeds to execute the end function statement 69, thereby terminating function 130.

If at any point in the execution of block of code 135 or remaining assertion code 141 an assertion test fails, the processing element 22 branches to mode test instructions 152 in response to the translated assertion instructions defining the failed assertion test. In response to the mode test instructions 152, the processing element 22 tests the mode indicator 139 to determine whether the assertion handling code 155 should be executed or whether the processing element 22 should return to function 130 to continue execution. Since the mode indicator 139 indicates that mode 1 has been selected and, therefore, that assertion testing is turned on, processing element 22 proceeds to execute assertion handling code 141. In response to the assertion handling code 155, the processing element 22 terminates execution of compiled program 115. Therefore, if an assertion test fails during the execution of function 130, the execution of program 115 is terminated.

Assume in a second example that the mode indicator 139 indicates selection of mode 2 as the mode of operation. In other words, the mode indicator 139 indicates that assertion testing is turned off so that the program 48 is not terminated in response to a failed assertion test. Assume that at some point after the selection of the mode of operation, the processing element 22 executes the block of code 135. As previously set forth hereinabove, translated assertion instructions are preferably included at stall locations in the block of code 135 and are, therefore, executed while other instructions in the block of code 135 are being stalled.

Once the block of code 135 is executed, the processing element 22 executes mode test instructions 144. In response to the mode test instructions 144, the processing element 22 tests the mode indicator 139 to determine whether the remaining assertion code 141 should be executed or whether the remaining assertion code 141 should be bypassed. Since the mode indicator 139 indicates that mode 2 has been selected and, therefore, that assertion testing is turned off, processing element 22 branches around remaining assertion code 141 and executes the end function statement 69, thereby terminating function 130. Therefore, processor time is not utilized executing the remaining assertion code 141.

If at any point in the execution of block of code 135 an assertion test fails, the processing element 22 branches to mode test instructions 152 in response to the translated assertion instructions defining the failed assertion test. In response to the mode test instructions 152, the processing element 22 tests the mode indicator 139 to determine whether the assertion handling code 155 should be executed or whether the processing element 22 should return to function 130 to continue execution. Since the mode indicator 139 indicates that mode 2 has been selected and, therefore, that assertion testing is turned off, processing element 22 returns to block of code 135 to complete the execution of the function 130. Therefore, if an assertion test fails during the execution of function 130, the execution of program 115 is not terminated.

Assume in a third example that the mode indicator 139 indicates selection of mode 3 as the mode of operation. In other words, the mode indicator 139 indicates that assertion testing is not turned off but should only be performed to the extent that processor performance is not significantly impacted by the assertion testing. Assume that at some point after the selection of the mode of operation, the processing element 22 executes the block of code 135. As previously set forth hereinabove, translated assertion instructions are preferably included at stall locations in the block of code 135 and are, therefore, executed while other instructions in the block of code 135 are being stalled.

Once the block of code 135 is executed, the processing element 22 executes mode test instructions 144. In response to the mode test instructions 144, the processing element 22 tests the mode indicator 139 to determine whether the remaining assertion code 141 should be executed or whether the remaining assertion code 141 should be bypassed. Since the mode indicator 139 indicates that mode 3 has been selected and, therefore, that assertion testing should be performed only to the extent that processor performance is not significantly impacted, processing element 22 branches around remaining assertion code 141 as execution of the remaining assertion code 141 would utilize processor time and extend the execution of function 130 when the function 130 is otherwise ready to terminate. In particular, the processing element 22 branches from the mode test instructions 144 directly to the end function statement 69, thereby terminating function 130. Therefore, processor time is not utilized executing the remaining assertion code 141, and the execution of function 130 is not needlessly extended by the execution of translated assertion instructions.

If at any point in the execution of block of code 135 an assertion test fails, the processing element 22 branches to mode test instructions 152 in response to the translated assertion instructions defining the failed assertion test. In response to the mode test instructions 152, the processing element 22 tests the mode indicator 139 to determine whether the assertion handling code 155 should be executed or whether the processing element 22 should return to function 130 to continue execution. Since the mode indicator 139 indicates that mode 3 has been selected and, therefore, that assertion testing is not turned off, processing element 22 proceeds to execute assertion handling code 141. In response to the assertion handling code 141, the processing element 22 terminates execution of compiled program 115. Therefore if an assertion test fails during the execution of function 130, the execution of program 115 is terminated.

As a result of the foregoing, a determination does not have to be made at compile time whether the program 46 should be compiled into a version that performs assertion testing or into an optimized version that does not perform assertion testing. Instead, translated assertion instructions can be inserted into a compiled version of the program 46 (i.e., into compiled program 115) and a decision at run time can be made whether to turn assertion testing on or off. Furthermore, an option can be provided based on an input at run time to turn assertion testing on but only to the extent that processor performance is not significantly affected. Accordingly, programmers should be encouraged to compile program 46 into versions capable of performing assertion testing.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A system for enabling selective assertion testing of computer programs based on run time inputs, comprising:

memory; and a compiler configured to translate a first function of a first program stored in said memory into a second function of a second program, said first function having assertion instructions, said second function having translated assertion instructions translated from said assertion instructions of said first function, said compiler configured to enable selective execution of a portion of said translated assertion instructions based on a run time input, wherein said compiler is further configured to enable selective execution of assertion handling code based on said run time input in response to a failed assertion test that is defined by said translated assertion instructions.

2. A system for enabling selective assertion testing of computer programs based on run time inputs, comprising:

memory; and a compiler configured to translate a first program stored in said memory into a second program, said first program having assertion instructions, said compiler configured to translate said assertion instructions into translated assertion instructions and to insert said translated assertion instructions into said second program, said compiler configured to detect a stall location in said second program and to insert one of said translated assertion instructions into said second program at said stall location in response to a detection of said stall location, said compiler further configured to insert mode selection instructions and mode test instructions in said second program, wherein said mode selection instructions, when executed by a processing element, cause said processing element to control a value of a mode indicator based on a run time input, and wherein said mode test instructions, when executed by said processing element, cause said processing element, based on said mode indicator, to control whether at least one of said translated assertion instructions is executed by said processing element.

3. The system of claim 2, wherein said compiler is configured to automatically generate said mode selection instructions and said mode testing instructions in response to at least one of said assertion instructions in said first program.

4. The system of claim 2, wherein:

said translated assertion instructions and said mode test instructions are inserted into a single function of said second program by said compiler;

said compiler is further configured to insert assertion handling instructions and a second set of mode test instructions into said second program and outside of said function, said assertion handling instructions, when executed by said processing element, cause said processing element to terminate execution of said second program;

at least one of said translated assertion instructions, when executed by said processing element, causes said processing element to branch to said second set of mode testing assertions in response to a failed assertion test; and said second set of mode test instructions, when executed by said processing element, causes said processing element to control whether said assertion handling instructions are executed based on said value of said mode indicator.

5. The system of claim 4, wherein said second set of mode test instructions, when executed by said processing clement, causes said processing element to branch back to said function if said value of said mode indicator indicates that said assertion handling instructions are not to be executed.

6. The system of claim 2, wherein said mode selection instructions and mode test instructions are not translated by said compiler from any instructions in said fist program.

7. A Method for enabling selective assertion testing of computer programs based on run time inputs, comprising the step of:

translating a first function of a first computer program into a second function of a second computer program, said first function having assertion instructions, said second function having translated assertion instructions translated from said assertion instructions of said first function;

detecting stall locations within said second function of said second computer program;

inserting one of said translated assertion instructions into one of said stall locations in response to a detection of said one stall location in said detecting step;

inserting a block of said translated assertion instructions into said second function;

enabling selective execution of said block of translated assertion instructions based on a run time input; and enabling selective execution, based on said run time input of assertion handling code in response to a failed assertion test that is defined by said translated assertion instructions.

8. A method for enabling selective assertion testing of computer programs based on run time inputs, comprising the steps of:

translating a first function of a first computer program into a second function of a second computer program, said first function having assertion instructions, said second function having translated assertion instructions translated from said assertion instruction of said first function; and enabling selective execution of a portion of said translated assertion instructions based on a run time input detecting stall locations in said second function;

inserting into said stall locations each said translated assertion instruction that is outside of said portion; and enabling selective execution, based on said run time input, of assertion handling code in response to a failed assertion test defined by said translated assertion instructions.

* * * * *

UNITED STATES PATENT AND TRADEMARK OFFICE
CERTIFICATE OF CORRECTION

PATENT NO. : 6,701,518 B1
DATED : March 2, 2004
INVENTOR(S) : Lawrence D.K.B. Dwyer et al.

It is certified that error appears in the above-identified patent and that said Letters Patent is hereby corrected as shown below:

Column 13,
Line 41, delete "clement" and insert therefor -- element --
Line 47, delete "fist" and insert therefor -- first --

Column 14,
Line 1, delete "Method" and insert therefor -- method --
Line 34, delete "instruction" and insert therefor -- instructions --

Signed and Sealed this

Eighth Day of February, 2005

JON W. DUDAS
*Director of the United States Patent and Trademark Office*